(12) United States Patent
Rich

(10) Patent No.: US 6,508,257 B1
(45) Date of Patent: Jan. 21, 2003

(54) FOOD WASHING APPARATUS WITH ROTARY AGITATOR AND METHOD FOR WASHING FOOD

(76) Inventor: Sandra S. Rich, 3217 Abbeywood Dr., Decatur, GA (US) 30034

( * ) Notice: Subject to any disclaimer, the term of this patent is extended or adjusted under 35 U.S.C. 154(b) by 100 days.

(21) Appl. No.: 09/659,236

(22) Filed: Sep. 11, 2000

Related U.S. Application Data

(60) Provisional application No. 60/153,555, filed on Sep. 13, 1999.

(51) Int. Cl.$^7$ ................................. B06B 3/04
(52) U.S. Cl. ................. 134/25.3; 134/57 R; 134/58 R; 134/113; 134/186; 99/536
(58) Field of Search .................. 99/516, 534, 535, 99/536; 134/25.3, 56 R, 57 R, 58 R, 113, 140, 184, 186, 200

(56) References Cited

U.S. PATENT DOCUMENTS

| | | | | |
|---|---|---|---|---|
| 4,173,051 A | * | 11/1979 | Reid | 134/191 |
| 5,184,544 A | * | 2/1993 | Ling | 134/149 |
| 5,671,664 A | * | 9/1997 | Jacobson | 134/102.3 |
| 5,704,281 A | * | 1/1998 | Huang | 134/149 |
| 5,927,304 A | * | 7/1999 | Wen | 134/115 R |

* cited by examiner

Primary Examiner—Randy Gulakowski
Assistant Examiner—Joseph Perrin
(74) Attorney, Agent, or Firm—Barry E. Kaplan; Myers & Kaplan

(57) ABSTRACT

A hands-free, electrically operated food washing device having a fluid dispenser, such as a reservoir, a wash compartment, a motor-driven agitator, a removable food basket, and a drain for removing soiled fluid from the device. Also provided are controls allowing a user to vary wash cycle parameters.

31 Claims, 1 Drawing Sheet

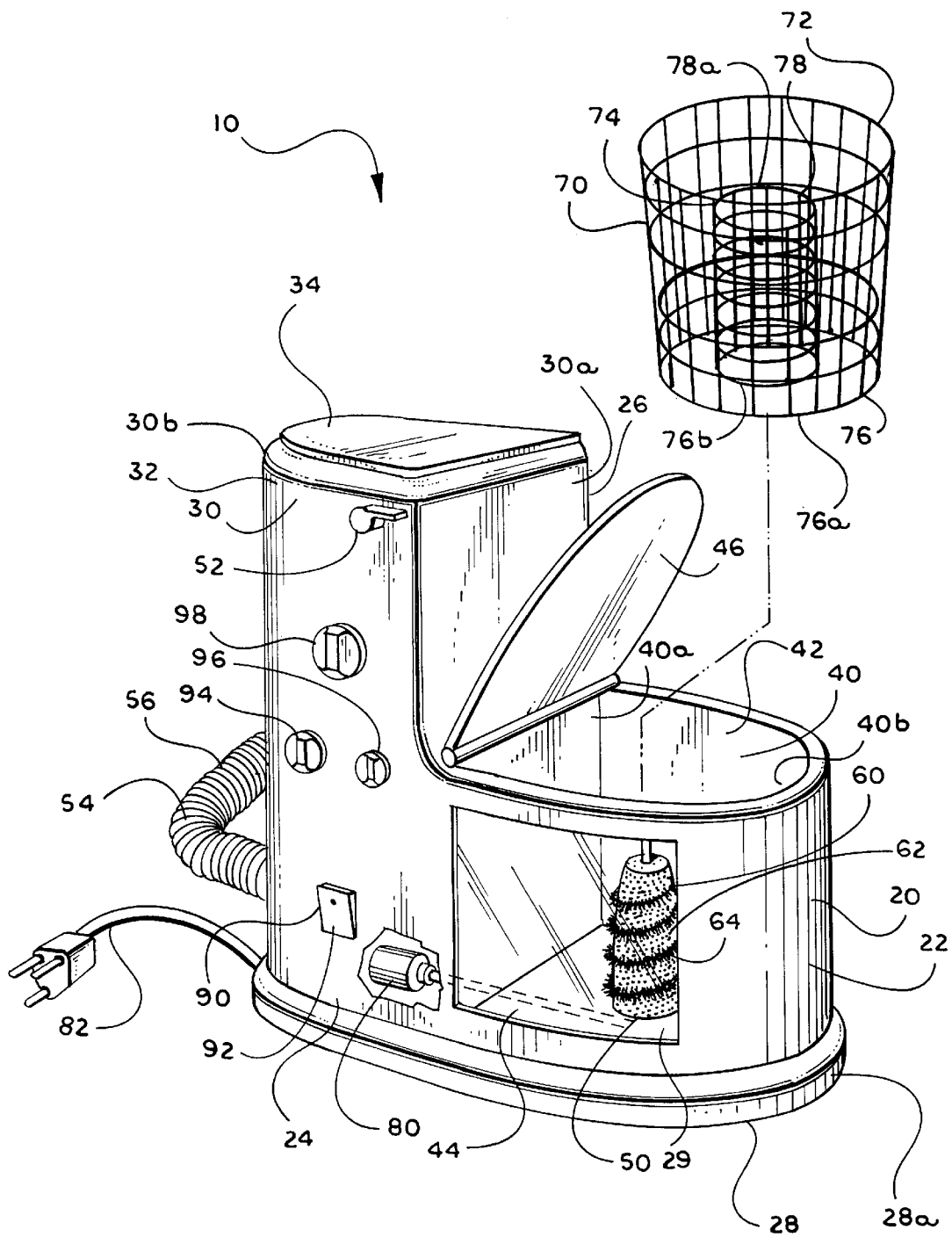

FOOD WASHING APPARATUS WITH ROTARY AGITATOR AND METHOD FOR WASHING FOOD

RELATED APPLICATIONS

This non-provisional application claims the benefit of Provisional Application Serial No. 60/153,555, filed on Sep. 13, 1999.

TECHNICAL FIELD

The present invention relates generally to kitchen accessories and, more specifically, to a food washing device capable of washing fruits and vegetables and means therefor. The present invention is particularly useful in, although not strictly limited to, kitchen applications where it is desired to provide hands-free, time-controlled washing of foods.

BACKGROUND OF THE INVENTION

It is well known that almost all dietary guidelines recommend high consumption of fruits and vegetables. Benefits touted include decreased cholesterol, decreased risk of heart disease, decreased risk of cancer, and increased energy. Frozen and canned fruits and vegetables provide nutritional benefits and offer long-term storage. It remains undisputed, however, that fresh fruits and vegetables supply beneficial nutrients that are frequently lost in canned and processed foods. As a result, it is recommended that dietary requirements be satisfied with fresh fruits and vegetables as often as possible.

Prior to consuming fresh foods, however, effective cleansing is essential. The benefits derived from natural antioxidants, vitamins, and fiber can otherwise be negated due to the potential presence of pesticides, fertilizers, and bacteria. Some pesticides have been linked to increased risks of cancer. Improper washing can even result in death, such as with ingestion of *E-coli* bacterial contamination.

A direct result of consumer awareness regarding dietary guidelines and the necessity of food cleansing is reflected in the new generation of food washing products. A few attempts have been made to design a suitable cleanser or device for washing fresh fruits and vegetables. However, in view of the present invention, these cleansers and devices are disadvantageous.

For instance, one such cleanser is a soapy type liquid concentrate into which fruits and vegetables can be immersed. Alternatively, the soapy type liquid can be sprayed directly onto the food. Disadvantages of this type of cleanser includes: the time involved in applying the cleanser; the task of effectively distributing it over the produce to be cleaned; and the chore of rinsing and removing the residual cleanser from the food prior to consumption. Not only is the process time consuming, but effective washing and removal of the cleansing product itself is often difficult.

Another alternative incorporates a plastic bowl and is strainer in combination. Fruits and vegetables to be washed may be immersed within the strainer and bowl, with the strainer handle manually rotated for a pseudo-agitation. This device is disadvantageous because it, too, requires a lengthy hands-on approach.

Therefore, it is readily apparent that there is a need for a food washing device wherein hands-free, time controlled washing of fruits and vegetables is provided; thereby, resulting in automatic and effective cleansing of fresh foods. It is to such an improvement that the present invention is directed.

BRIEF SUMMARY OF THE INVENTION

Briefly described, in a preferred embodiment, the present invention overcomes the above-mentioned disadvantages, and meets the recognized need for such a device, by providing a food washing device wherein fresh fruits and vegetables are automatically agitated and cleansed.

According to its major aspects and broadly stated, the present invention is a food washing appliance having a fluid dispensing means, such as a reservoir, a removable basket, a motor-driven agitator, and a timer.

More specifically, the present invention is an electrically operated food washing appliance having a fluid reservoir wherein washing fluid can be held and subsequently introduced into a washing compartment having an agitator and removable food basket. Both compartments are provided with hinged lids, thereby allowing complete access. A drain having a retractable hose is attached to the washing compartment to allow for the controlled release of dirty washing fluid.

The appliance includes a space-saving retractable power cord and has electrical controls for length and intensity of wash cycle. Wash intensity is a function of agitator motion and may be observed through a compartment window. The motor-driven agitator includes a plurality of apertures, wherein wash fluid is disbursed therefrom onto the food in the basket within the washing compartment and, thereby, loosening particulate matter and residue adhered thereto. The food basket functions to contain the food within the washing compartment and to protect the food from direct contact with the agitator. Dirt, foreign residue, and residual insecticides and pesticides are removed by the swirling action of the wash fluid.

Thus, an object, feature, and advantage of the present invention is to provide a food washing appliance that is simple to use.

Another object, feature, and advantage of the present invention is to provide a food washing appliance enabling the hands-free washing of fruits and vegetables.

Still another object, feature, and advantage of the present invention is to provide a food washing appliance having a motor-driven agitator to distribute and swirl wash fluid.

Yet still another object, feature, and advantage of the present invention is to provide a food washing appliance having a retractable drain hose to allow for the controlled release of soiled wash fluid.

A further object, feature, and advantage of the present invention is to provide a food washing appliance having automatic washing cycles wherein the length and intensity of each cycle is electrically controlled.

These and other objects, features, and advantages of the present invention will become more apparent to one ordinarily skilled in the art from a review of the following Detailed Description and Claims when read in light of the accompanying drawing Figure.

BRIEF DESCRIPTION OF THE DRAWINGS

The present invention will be better understood by reading the Detailed Description of the Preferred and Alternate Embodiments with reference to the accompanying drawing Figure, in which like reference numerals denote similar structure and refer to like elements throughout, and in which:

FIG. 1 is a perspective view of a food washing device according to a preferred embodiment of the present invention showing a basket removed from a wash compartment.

DETAILED DESCRIPTION OF THE PREFERRED AND ALTERNATE EMBODIMENTS

In describing the preferred and alternate embodiments of the present invention, as illustrated in the Figure, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIG. 1, the present invention is a food washing device 10 having housing 20, fluid dispensing means in the form of reservoir 30, wash compartment 40, agitator 60, basket 70, motor 80 (not shown), and controls 90–98.

Housing 20 has outer surface 22 preferably manufactured from plastic and preferably substantially opaque. However, one skilled in the art will recognize that although plastic is the preferred material, housing 20 could be manufactured from, for exemplary purposes only, stainless steel, other various metals or glass. Housing 20 has a front surface 24, a rear surface 26 and a base 28. Preferably, base 28 is substantially oval shaped, extending outwardly from outer surface 22; thereby, providing a supportive edge 28a. Housing 20 defines fluid reservoir 30 and wash compartment 40, wherein fluid reservoir 30 and wash compartment 40 are independent compartments integrally located within housing 20. Housing 20 also defines a substantially transparent viewing window 29 within outer surface 22 of wash compartment 40, allowing a user to see therewithin. Preferably, viewing window 29 is substantially rectangularly shaped.

Fluid reservoir 30 has upper end 32, wherein lid 34 is hingedly attached thereto for ease of accessibility. Preferably, fluid reservoir 30 is approximately twice the height of wash compartment 40 and is located proximal thereto, wherein washing fluid can be introduced into fluid reservoir 30 and held therein for subsequent introduction to wash compartment 40. Fluid reservoir 30 has a substantially flat end wall 30a and a substantially U-shaped end wall 30b. Preferably, fluid reservoir 30 has a scribed line therein to assist the user in determining proper fill capacity of the reservoir.

Preferably, wash compartment 40 has a substantially flat end wall 40a and a substantially U-shaped end wall 40b, wherein flat wall 40a of wash compartment 40 and flat wall 30a of fluid reservoir 30 are formed integrally, and wherein fluid reservoir 30 and wash compartment 40, together, define a substantially oval plane-view shape. Wash compartment 40 has upper end 42 and interior base surface 44. Lid 46 is hingedly attached to upper end 42 of wash compartment 40 for ease of accessibility.

Drain 50 is located within base surface 44 of wash compartment 40. Preferably, drain 50 is mechanically operated via drain lever 52, wherein drain lever 52 is mounted on outer surface 22 of housing 20. Drain hose 54 is coupled to drain 50 to allow for the controlled release of dirty washing fluid upon user depression of drain lever 52 to open drain 50. Preferably, drain hose 50 is retractable and has first end 54a (not shown), second end 54b (not shown) and outer surface 56. First end 54a is securely coupled to drain 50 wherein the attachment provides a watertight seal. Preferably, hook 58 (not shown) is fixedly mounted on rear surface 26 of housing 20, wherein outer surface 56 of drain hose 50 may be secured thereon when not in use.

Preferably, agitator 60 is centrally mounted within wash compartment 40. Agitator 60 is generally cylindrically shaped and is movably secured on a central axis 62. Agitator 60 is preferably motor-driven and operates rotationally about axis 62. One skilled in the art will recognize that although rotational movement is preferred, longitudinal movement could also be provided. It should also be noted that in lieu of a motor-driven agitator, a hand crank or pump may be utilized to rotate or manipulate agitator 60. Operational movement of agitator 60 results in movement of wash fluid within wash compartment 40; thus, wash intensity is a function of agitator motion. Agitator 60 has outer surface 62 with a plurality of apertures 64 provided therein. Preferably, apertures 64 are aligned to create a continuous pattern encircling agitator 60, whereby awash fluid is dispensed therethrough at a plurality of heights and locations. One skilled in the art will recognize that alternate aperture designs and locations may be utilized to provide equivalent methods of dispensing wash fluid.

Basket 70 for retaining food items is removably secured within wash compartment 40. Preferably, basket 70 is wire mesh. Basket 70 is generally cylindrically shaped with outer wall 72, inner wall 74, and base wall 76. Inner wall 74 defines a central cavity 78 with top wall 78a. Base wall 76 is generally circular with outer edge 76a adjacent to outer wall 74, and inner edge 76b adjacent to inner wall 74. Central cavity 78 is dimensioned to surround agitator 60 such that central cavity 78 is not in contact with agitator 60, but, rather, prevents food items from contact therewith.

Motor 80 preferably is located within housing 20, beneath wash compartment 40, and functions to provide power to agitator 60. Standard household power is provided to motor 80 with a standard electrical cord 82 connected thereto. Preferably, electrical cord 82 is retractable to allow for compact storage thereof.

A plurality of electrical controls 90–98 are engaged on front surface 24 of housing 20. Preferably, the electrical controls include on-off switch 92, regular cycle selector knob 94, gentle cycle selector knob 96, and timer 98. Regular cycle selector knob 94 and gentle cycle selector knob 96 function to control the action of agitator 60 and, thereby, allow a user to choose wash intensity based upon the type of fruit or vegetable to be washed. Timer 98 functions to control the length of the wash cycle. Preferably, variable time periods may be selected up to a maximum of about fifteen minutes.

Although the exemplary embodiment of the present invention has been described above in detail, one ordinarily skilled in the art will appreciate that various modifications, variations, and alternate embodiments may be provided to enhance, vary, and provide additional consumer benefits to the invention. Exemplary alternate embodiments are provided below. For example:

In an alternate embodiment, base 28 of housing 20 could define a different shape, such as, for exemplary purposes only, a rectangle, square, or diamond.

In an alternate embodiment, outer surface 22 of base 28 of housing 20 could have elastomeric feet to assist in secure positioning.

In another alternate embodiment, central cavity 78 could be substantially cone shaped.

In yet another alternate embodiment, viewing window 29 could be a different shape, such as, for exemplary purposes only, circular, oval, or square, and might follow the contour of outer surface 22.

In still yet another alternate embodiment, food washing device could be formed without a viewing window.

In yet still another alternate embodiment, the height of fluid reservoir 30 could be substantially the same as the height of wash compartment 40.

In still another alternate embodiment, the apertures 64 in agitator 60 could be arranged in concentric circles surrounding agitator 60, in longitudinal lines along the length of agitator 60, or randomly disbursed or patterned to substantially cover agitator 60. Similarly, apertures 64 might be located at different positions within wash compartment 40 and might be provided with jet-like nozzles.

In yet another alternate embodiment, basket 70 could be another shape, such as, for exemplary purposes only, square or oval.

In yet still another alternate embodiment, basket 70 could have a handle.

In still another alternate embodiment, basket 70 could be plastic or any other suitable material.

In yet another alternate embodiment, food washing device 10 could be manufactured in appropriately larger-scaled forms for commercial use.

In yet still another embodiment, the fluid reservoir 30 might comprise another form of fluid dispensing means, as by direct connection to a clean water line with a nozzle or other similar arrangement for directing clean water into washing compartment 40.

In an alternate embodiment, the food washing device 10 could include a cleanser receptacle and dispensing means.

In another alternate embodiment, wash compartment 40 could include a light.

In yet another alternate embodiment, wash compartment 40 could include more than one agitator.

In still another alternate embodiment, basket 70 could be engaged on an axis and could be driven to rotate.

In yet still another alternate embodiment, fluid is reservoir 30 could have a removable insert for transporting fluid.

In yet another alternate embodiment, timer 98 could include an audible indicator.

In still another alternate embodiment, fluid reservoir 30 and wash compartment 40 could be one combined compartment wherein fluid is added by the user directly into the wash compartment.

In yet still another alternate embodiment, fluid reservoir 30 could be provided with a sight glass, or other fluid level fill indicator, to assist the user in determining proper fill capacity of the reservoir.

Having now described the preferred and alternate embodiments of the device of the present invention, we turn to the preferred manner of use of the device. Accordingly, in use, vegetables or fruit are placed into basket 70 and lid 46 is opened. Basket 70 is placed inside wash compartment 40 with central cavity 78 of basket 70 surrounding agitator 60. After closing lid 46 of wash compartment 40, lid 34 of fluid reservoir 30 is opened and fluid reservoir 30 is filled with water, and lid 34 is then closed. Cycle length and intensity are selected by turning the appropriate control knob 94 or 96, and 98. The food washing device 10 is started by depressing the on-off switch 92.

The user then enjoys the benefit of being able to perform other tasks in the kitchen while the device 10 automatically introduces fluid from fluid reservoir 30 through the apertures 64 in agitator 60, and into wash compartment 40; thereby, loosening dirt particles on the food items as wash compartment 40 fills with fluid. Once wash compartment 40 is filled, agitator 60 begins rotational movement, causing the fluid in the wash compartment 40 to swirl around the food items; thereby, cleaning those items. The front-mounted viewing window 29 allows the user to observe the washing cycle.

When the programmed time has expired, agitation ceases, and the cleaned food is removed by pulling basket 70 out of wash compartment 40. The soiled water is drained into a sink or other receptacle by appropriately situating retractable hose 54 and pushing down drain lever 52.

Having thus described the exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A food washing device comprising:
 a housing having an exterior surface;
 a fluid dispensing means comprising a fluid reservoir within said housing;
 a washing compartment within said housing;
 an agitator carried by said housing and within said washing compartment;
 a food receptacle;
 means for moving said agitator; and,
 means for draining fluid from said washing compartment, wherein said fluid dispensing means is in fluid communication with said washing compartment.

2. The food washing device of claim 1, wherein said means for moving said agitator comprises an electric motor mechanically coupled to drive said agitator and an electrical cord operatively coupled to said motor, said electrical cord connectable to a power source, and wherein said housing further comprises a control means for said electric motor.

3. The food washing device of claim 2, wherein said control means for said electric motor comprises a switch movable between a first, non-energizing position and a second, energizing position.

4. The food washing device of claim 3, wherein said control means further comprises at least one switch movable between a first position and a second position, wherein said first position functions to limit power thereby slowing agitator movement, and wherein said second position functions to maximize power thereby accelerating agitator movement.

5. The food washing device of claim 2, wherein said agitator is movably secured on a central axis within said washing compartment.

6. The food washing device of claim 2, further comprising at least one timing means to control automatically the operation of said electric motor, wherein said timing means includes a control movable, between a plurality of selectable time period positions, and wherein said control is mounted on said exterior surface of said housing.

7. The food washing device of claim 2, wherein said electrical cord is retractable into said housing.

8. The food washing device of claim 1, wherein said draining means comprises a drain in said washing compartment coupled to a drain hose, and wherein said draining means further comprises means for activating said drain.

9. The food washing device of claim 8, wherein said activation means comprises a control movable between a first closed-drain position and a second open-drain position.

10. The food washing device of claim 8, wherein said drain hose is retractable into said housing.

11. The food washing device of claim 1, wherein said housing comprises a substantially transparent viewing area, wherein said washing compartment area can be viewed from the exterior of said food washing device.

12. The food washing device of claim 1, wherein said agitator further comprises a plurality of apertures whereby fluid is disbursed therefrom.

13. The food washing device of claim 1, further comprising a base having an upper surface and a lower surface, wherein said housing is mounted on said upper surface.

14. The food washing device of claim 13, further comprising a plurality of elastomeric feet carried on said lower surface of said base to frictionally secure said food washing device in a desired position.

15. The food washing device of claim 1, wherein said fluid reservoir further comprises a lid hingedly attached to said housing.

16. The food washing device of claim 1 wherein said food receptacle is carried within said washing compartment and adapted to move rotationally therewithin.

17. An automatic food washing device comprising:
- a housing having an exterior surface;
- a fluid reservoir defined within said housing;
- a first lid hingedly attached to said fluid reservoir;
- a wash compartment defined within said housing;
- a second. lid hingedly attached to said wash compartment;
- a base, wherein said housing is mounted-thereon;
- an agitator movably secured on a central axis within said wash compartment;
- an electric motor mechanically coupled to drive said agitator;
- means for controlling said motor;
- an electrical cord operatively coupled to said motor;
- a food receptacle, said food receptacle dimensioned to be received within said wash compartment and to surround said agitator;
- a drain located in said wash compartment; and,
- means for dispensing a liquid from said fluid reservoir to said wash compartment.

18. The food washing device of claim 17, wherein said control means comprises a switch movable between a first, non-energizing position and a second, energizing position, wherein said switch is carried on said exterior surface of said housing.

19. The food washing device of claim 18, wherein said control means further comprises at least one switch movable between a first position wherein said first position functions to limit power thereby slowing agitator movement and a second position wherein said second position functions to maximize power thereby accelerating agitator movement.

20. The food washing device of claim 18, wherein said control means further comprises at least one timing means to control automatically the operation of said electric motor wherein said timing means includes a control movable between a plurality of selectable time period positions and wherein said control is carried by said exterior surface of said housing.

21. The food washing device of claim 17, wherein said housing comprises a substantially transparent viewing area extending through said exterior surface of said housing.

22. The food washing device of claim 17, further comprising an activation means for opening and closing said drain, said activation means comprising a control movable between a first closed-drain position and a second open-drain position.

23. The food washing device of claim 17, wherein said dispensing means comprises a plurality of apertures. formed in said agitator, and wherein said apertures are in fluid communication with said fluid reservoir and fluid is disbursed therethrough said apertures.

24. The food washing device of claim 17, further comprising a drain hose connected to said drain, wherein said drain hose and said electrical cord are retractable into said housing.

25. The food washing device of claim 17, wherein said base is substantially oval shaped.

26. The food washing device of claim 17, wherein said food receptacle is removable.

27. The food washing device of claim 17, further comprising a cleanser receptacle in fluid communication with said washing compartment, wherein cleanser solution is dispensable into said washing compartment.

28. The food washing device of claim 17, further comprising a light wherein said light is operatively mounted within said wash compartment.

29. The food washing device of claim 17, further comprising a plurality of agitators.

30. The food washing device of claim 17, further comprising an audible cycle-completion indicator.

31. A process for use of the food washing device according to claim 1 comprising the steps of:
   a) placing food to be washed, into said washing compartment;
   b) transferring fluid from said fluid dispensing means to said washing compartment; and,
   c) rotating said agitation means to wash the food.

* * * * *